United States Patent
Kozakura et al.

(10) Patent No.: US 6,805,646 B2
(45) Date of Patent: Oct. 19, 2004

(54) DOUBLE-SIDED MESHING TYPE SILENT CHAIN

(75) Inventors: Nobuto Kozakura, Osaka (JP); Toshifumi Sato, Osaka (JP)

(73) Assignee: Tsubakimoto Chain Co., Osaka (JP)

(*) Notice: Subject to any disclaimer, the term of this patent is extended or adjusted under 35 U.S.C. 154(b) by 302 days.

(21) Appl. No.: 09/940,311

(22) Filed: Aug. 28, 2001

(65) Prior Publication Data

US 2002/0025870 A1 Feb. 28, 2002

(30) Foreign Application Priority Data

Aug. 29, 2000 (JP) ........................ 2000-259455

(51) Int. Cl.[7] ................................. F16G 13/09
(52) U.S. Cl. ........................ 474/213; 474/212
(58) Field of Search .................. 474/202, 206, 474/212–215

(56) References Cited

U.S. PATENT DOCUMENTS

| 1,956,942 A | * | 5/1934 | Belcher et al. ............. 474/139 |
| 4,832,668 A | | 5/1989 | Ledvina et al. |
| 5,445,570 A | * | 8/1995 | White ........................ 474/213 |
| 5,803,854 A | * | 9/1998 | Tada et al. .................. 474/213 |
| 5,967,926 A | * | 10/1999 | Kozakura et al. ........... 474/213 |
| 6,142,902 A | * | 11/2000 | Ichikawa et al. ........... 474/212 |
| 6,171,209 B1 | * | 1/2001 | Matsuda ..................... 474/213 |
| 6,334,829 B1 | * | 1/2002 | Saito et al. ................ 474/213 |
| 6,440,022 B1 | * | 8/2002 | Ichikawa et al. ........... 474/213 |

FOREIGN PATENT DOCUMENTS

| EP | 926394 A1 | * 6/1999 | ........... F16G/13/04 |
| GB | 2 076 500 A | 12/1981 | |
| GB | 2 326 213 A | 12/1998 | |
| JP | 2553206 | 7/1997 | |
| JP | 11-166600 A | 6/1999 | |
| JP | 11-257439 A | 9/1999 | |
| JP | 11257439 A | * 9/1999 | ........... F16G/13/04 |

* cited by examiner

*Primary Examiner*—David A. Bucci
*Assistant Examiner*—Timothy McAnulty
(74) *Attorney, Agent, or Firm*—Howson and Howson

(57) ABSTRACT

In a double-sided meshing type silent chain, guide plates each having a flat back face formed on one side thereof and a pair of pin-accommodation holes formed therein are disposed at opposite widthwise ends of the chain with the pin-accommodation holes press-fit with connecting pins which are each adapted to articulately connect two adjacent rows of link plates with each other in an interleaved fashion. The guide plates do not take part in meshing engagement with a sprocket but operate to guide the travel of the chain stably without causing flattering or vibration. The guide plates further serves as a strengthening member of the chain.

2 Claims, 11 Drawing Sheets

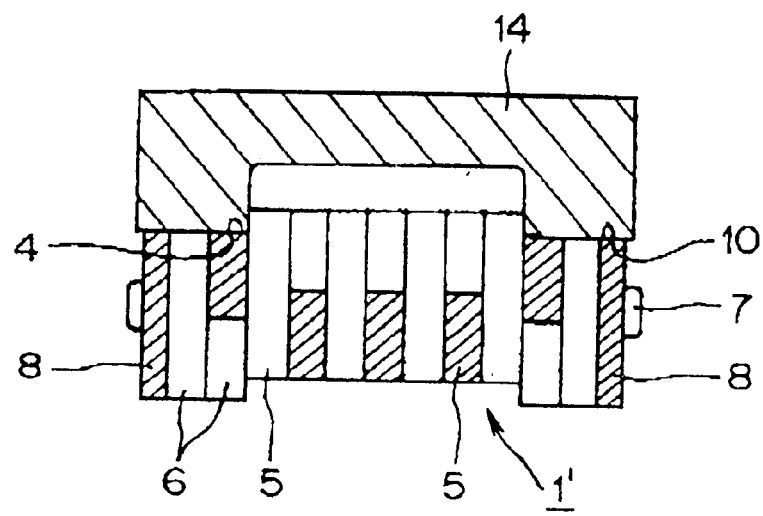
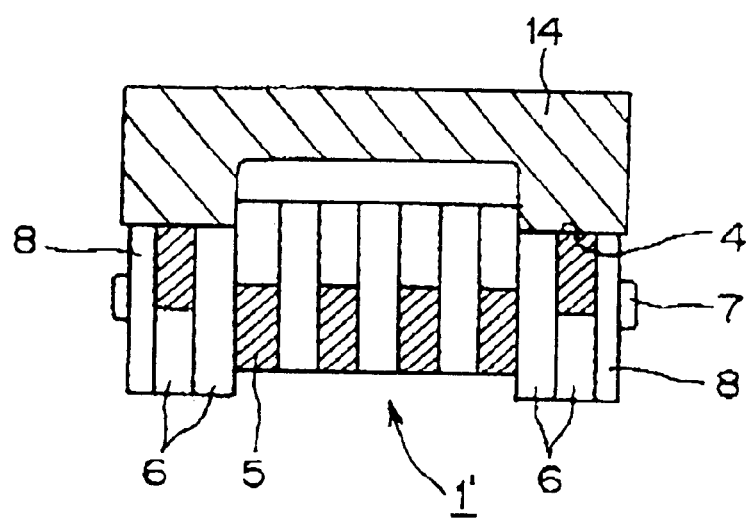

DOUBLE-SIDED MESHING TYPE SILENT CHAIN

BACKGROUND OF THE INVENTION

1. Field of the Invention

The present invention relates to a double-sided meshing type silent chain having meshing teeth on both inner and outer peripheral sides thereof for mesh with teeth of sprockets.

2. Description of the Related Art

Conventionally, as a timing chain used for transmitting rotation of an engine crankshaft to a cam-shaft or a shaft of an auxiliary device such as an oil pump, there is known a double-sided meshing type silent chain having meshing teeth on both inner and outer peripheral sides thereof so that the meshing teeth on the inner peripheral side of the chain rotate sprockets mounted to the crankshaft and camshaft, respectively, and the meshing teeth on the outer peripheral side of the chain rotate a sprocket mounted to the shaft of the auxiliary device (Japanese Patent Laid-open Publications Nos. HEI-11-166600 and HEI-11-257439).

When the known double-sided meshing type silent chain is wound around a driving sprocket mounted to an engine crankshaft, a first driven sprocket mounted to a camshaft of an intake valve mechanism and a second driven sprocket mounted to a camshaft of an exhaust valve mechanism, the meshing teeth on the inner peripheral side of the chain mesh with the respective teeth of the driving and driven sprockets. Thus, all the sprockets rotate in the same direction. In the case where the meshing teeth on the outer peripheral side of the chain mesh with a sprocket mounted to the shaft of an auxiliary device such as an oil pump disposed on the outer peripheral side of the chain, the sprocket of the auxiliary device rotates in a direction opposite to the direction of rotation of the driving sprocket mounted to the crankshaft (Japanese Utility Model Registration No. 2553206).

FIGS. 13 and 14 show one example of the conventional double-sided meshing type silent chains. As shown in these figures, the double-sided meshing type silent chain 51 includes a plurality of interleaved link plates 55, 56 each having a pair of meshing teeth 52 and a pair of pin-accommodation holes 53, the link plates 55, 56 being connected with one another by connecting pins 57 in an endless fashion in such a manner that the meshing teeth 52 project from both inner and outer peripheral sides of the chain 51. The link plates 55, 56 have a flat back surface 54 on a side thereof which is opposite to the front side on which the meshing teeth 52 are formed.

The link plates 55, 56 are oriented such that the meshing teeth 52 of plural laminated inner link plates 55 located centrally in the width direction of the chain 51 project inwardly with respect to the chain 51, and the meshing teeth 52 of two adjacent outer link plates 56 located at each end in the width direction of the chain 51 project outwardly with respect to the chain 51. An outermost one of the outer link plates 56 which is located at each widthwise end of the chain 51 has pin-accommodation holes 53 in which connecting pins 57 are press-fit.

A sprocket used for mesh with the meshing teeth 52 projecting inwardly from a central portion of the chain 51 comprises a general sprocket 64 (FIG. 17) which is designed for mesh with a single-sided meshing type silent chain. In FIG. 17, numeral 65 denotes teeth of the sprocket 64, and numeral 66 denotes a shaft on which the sprocket 64 is mounted.

Another example of the conventional double-sided meshing type silent chain is shown in FIGS. 20 and 21. The double-sided meshing type silent chain 68 is composed of inner link plates 55 and outer link plates 56 in a like manner as the silent chain 51 shown in FIGS. 13 and 14. The silent chain 68 is, however, different from the silent chain 51 in that connecting pins 57 are rotatably fit in the pin-accommodation holes 53 in the outermost link plates 56 located at opposite widthwise ends of the chain, and retainer rings 69 located outside the outermost link plates are firmly secured to the connecting pins 57 for preventing removal of the connecting pins 57.

When the conventional double-sided meshing type silent chains 51, 68 are wound around the driving sprocket on the engine crankshaft and the respective driven sprockets of the intake and exhaust valve mechanisms as previously described, one side which is in contact with these sprockets is an inner peripheral side of the silent chain, and the opposite side which is in contact with another sprocket mounted on the shaft of auxiliary device located outside the silent chain is an outer peripheral side of the silent chain.

The conventional double-sided meshing type silent chain shown in FIGS. 13 and 14 has a problem that since the connecting pins 57 are press-fit in the pin-accommodation holes 53 of the outermost link plates 56, when the outer link plates 65 are used for driving the sprocket of the auxiliary device shaft, the strength of the outermost link plates 56 is greatly reduced at an inner peripheral portion extending around each pin-accommodation hole 53 by the effect of a stress which is exerted on the winner peripheral surface of each pin-accommodation hole 53 when the meshing teeth 52 of the outermost link plates 56 collide with the teeth of the sprocket at the onset of meshing engagement, and a tensile stress which has been created in the inner peripheral portions of the pin-accommodation holes 53 of the outermost link plates due to press-fit connection with the connecting pins 57. The mechanical strength of the silent chain is considerably reduced.

The outermost link plates 56 undergo deformation or swelling occurring complicatedly in the radial direction of the connecting pins 57 when the connecting pins 57 and the pin-accommodation holes 53 are press-fit with each other. This makes it difficult for an engagement surface, such as an inside flank or an outside flank of meshing tooth, to keep a desired profile. Since the meshing accuracy is an important requirement for the silent chain, design of the silent chain should be done with the foregoing deformation of the outermost link plates 56 taken into consideration.

A sprocket 61, which meshes with the meshing teeth of the outer link plates 56, supports side surfaces of every other inner link plates 55 in the longitudinal direction of the chain. This may deteriorate the traveling stability of the chain, allowing widthwise vibration and twisting of the chain to occur.

When the teeth 52 of the outer link plates 56 and the teeth 62 of the sprocket 61 mesh with each other on the outer peripheral side of the double-sided meshing type silent chain 51, meshing at a portion of the chain 51 located on a line A—A shown in FIG. 14 occurs in a manner shown in FIG. 15, in which the inner link plates 55 (indicated by hatching) located next to the outer link plates 56 are in slide contact with opposite inside surfaces of the sprocket 61 to thereby guide the travel of the chain. However, at a portion of the chain 51 located on a line B—B shown in FIG. 14, meshing occurs in a manner as shown in FIG. 16, in which the inner link plates 55 located next to the outer link plates 56 are not in slide contact with the opposite inside surfaces of the sprocket 61. This may allow the chain to vibrate in the width direction thereof, thereby deteriorating the traveling stability of the chain. In FIGS. 15 and 16, numeral 63 denotes a shaft of the sprocket 61.

Even when a shoe 67 of a chain tensioner or of a guide member is disposed on a back surface side of the outer link plates 56 for guiding the chain, as shown in FIGS. 18 and 19, portions of the silent chain 51 located on the lines A—A and B—B of FIG. 14 are guided in such a manner as shown in FIGS. 18 and 19, respectively, in which only one of two adjacent outer link plates (indicated by hatching) is in sliding contact with the shoe 67 at each widthwise end of the chain. This arrangement increases surface pressure acting on the shoe 67, thereby accelerating wear of the shoe 67.

In the conventional double-sided meshing type silent chain 68 shown in FIGS. 20 and 21, since the outermost link plates 56 located at opposite widthwise ends of the chain are rotatably fitted with the connecting pins 57 with the retainer rings 69 provided to prevent removal of link plates 55 from the connecting pins 57, abrasive wear occurs due to relative rotation or pivotal movement between the pin-accommodation holes 53 of two adjacent rows K and C of interleaved link plates 55, 56 and the connecting pins 57, resulting in undue wear elongation of the silent chain 68. Additionally, since the retainer rings 69 do not act as a strengthening member capable us sustaining a chain tension, the strength of the silent chain 68 shown in FIGS. 20 and 21 is smaller than a silent chain having the same width.

SUMMARY OF THE INVENTION

An object of the present invention is to provide a double-sided meshing type silent chain which solves the above-mentioned problems involved in the related art, is capable of avoiding a reduction in strength caused due to press-fit connection between the outer link plates with meshing teeth and the connecting pins, thereby obtaining a greater strength than a conventional chain of the same width equipped with retainer rings, is able to improve the traveling stability of the chain when the meshing teeth of the outer link plates and teeth of a sprocket mesh with each other on an outer peripheral side of the chain, can reduce surface pressure per unit link plate to thereby minimize wear on a shoe when the shoe is in slide contact with the back surfaces of the outer link plates on the inner peripheral side of the chain, and is able to suppress elongation of the chain caused due to abrasive wear of the pin-accommodation holes and the connecting pins.

To achieve the above object, according to the present invention, there is provided a double-sided meshing type silent chain comprising: a plurality of interleaved rows of link plates articulately connected with one another by connecting pins, each of the link plates having a pair of meshing teeth formed on one side thereof, a flat back face formed on the opposite side thereof, and a pair of pin-accommodation holes rotatably receiving therein a pair of connecting pins, respectively, of the connecting pins. The link plates in each link plate row are composed of at least one pair of outer link plates disposed in opposite end portions, respectively, in the width direction of the chain, and a plurality of inner link plates disposed in a central portion in the wise direction of the chain disposed between the end portions. The inner and outer link plates are oriented such that the meshing teeth of the inner link plates project from one peripheral side of the chain and the meshing teeth of the outer link plates project from the opposite peripheral side of the chain. The chain further has guide plates located outside the row of link plates in the width direction of the chain. Each of the guide plates has a flat back face formed on one side thereof and a pair of pin-accommodation holes formed therein, the pin-accommodation holes being press-fit with the connecting pins.

It is preferable that the flat back faces of the outer link plates and the flat back faces of the guide plates lie flush with each other.

With this arrangement, since the outer link plates are not secured by press-fitting with the connecting pins as in the conventional chain but serves as a strengthening member of the chain. The chain has a greater strength than a conventional chain of the same width equipped with a retainer ring attached to opposite ends of each connecting pin to prevent removal of the pins from the link plates. When the chain is used with a sprocket disposed on an outer peripheral side of the chain, the guide plates are brought into sliding contact with opposite end faces of the sprocket, so that the chain can travel stably without causing lateral oscillation. When the chain is used with a guide member or a chain tensioner disposed on the inner peripheral side of the chain for sliding engagement with the flat back faces of the outer link plates, the flat back faces of the guide plates slidably engage a shoe of the guide member or chain tensioner concurrently with the flat back faces of the outer link plates.

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which:

FIG. 9 is a cross-sectional view corresponding to FIG. 5, but showing the manner in which a portion of the silent chain of the second embodiment is in mesh with a shoe disposed on an inner peripheral side of the silent chain;

FIG. 10 is a cross-sectional view corresponding to FIG. 6, but showing the manner in which a portion of the silent chain of the second embodiment is in mesh with the shoe disposed on the inner peripheral side of the silent chain;

DESCRIPTION OF THE PREFERRED EMBODIMENTS

The following description is merely exemplary in nature and is in no way intended to limit the invention or its application or uses.

Figure 1:
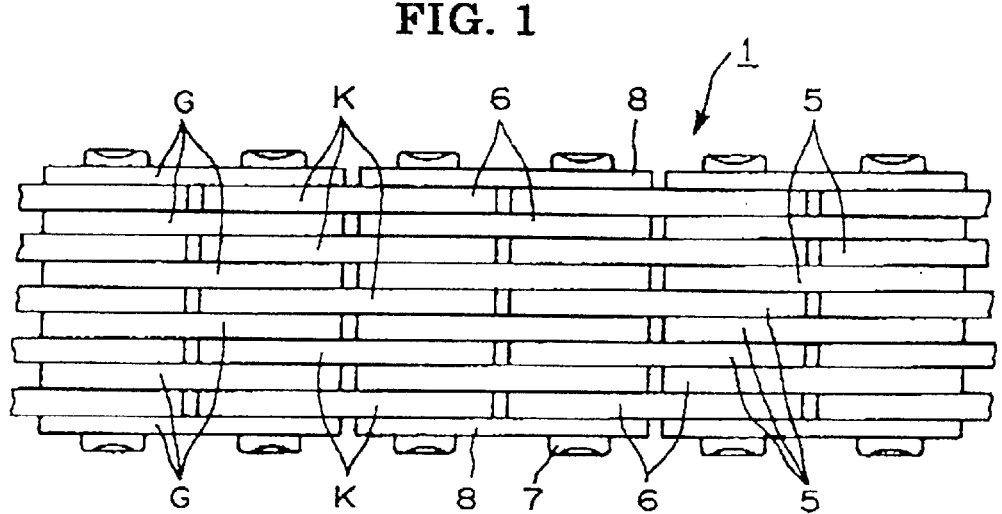
FIG. 1 is a fragmentary plan view of a double-sided meshing type silent chain according to a first embodiment of the present invention.
Figure 2:
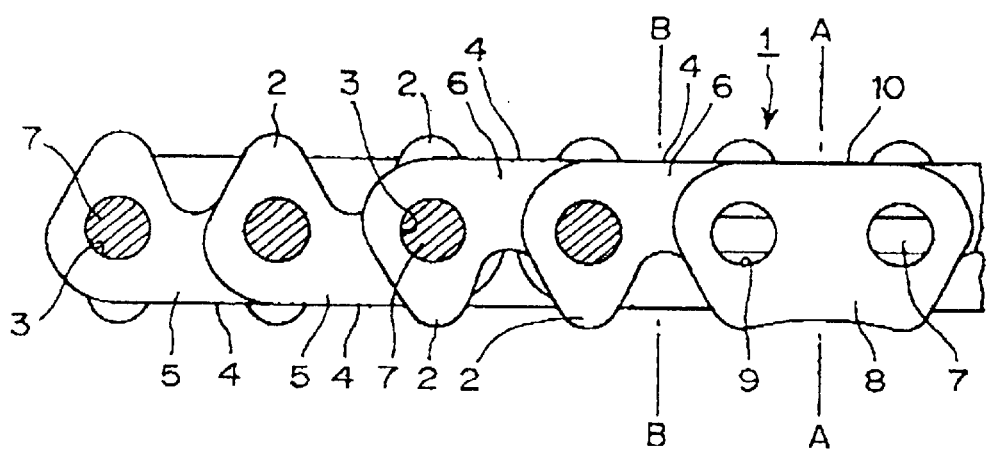
FIG. 2 is a side view of the double-sided meshing type silent chain shown in FIG. 1.

FIGS. 1 and 2 show a double-sided meshing type silent chain (hereinafter referred to simply as a "chain") 1 according to a first embodiment of the present invention. The chain 1 includes a plurality of interleaved rows of link plates 5, 6 articulately connected by connecting pins 7 in such a manner that adjacent link plates are arranged alternately and offset from one another in the longitudinal direction of the chain. Each of the link plates 5, 6 has a pair of meshing teeth 2 formed on one side thereof, a flat back face 4 formed on the opposite side thereof, and a pair of pin-accommodation holes 3 formed therein. The pin-accommodation holes 3 rotatably receive therein a pair of connecting pins 7, respectively, of the connecting pins 7.

Though not designated, the chain 1 has a central portion and opposite end portions arranged in the width direction of the chain with the central portion disposed between the end portions. In the illustrated embodiment, the link plates in each link plate row are composed of five inner link plates 5 disposed in the widthwise central portion of the chain 1, and one pair of outer links 6 disposed in the widthwise end portions, respectively, of the chain 1. The inner link plates 5 are oriented such that the meshing teeth 2 project from an inner peripheral side of the chain 1. The outer link plates 6 are oriented such that the meshing teeth 2 project from an outer peripheral side of the chain 1.

The chain 1 further has guide plates 8 located outside the outer link plates 6 in the width direction of the chain 1. Each of the guide plates 8 has a flat back face 10 formed on one side thereof and a pair of pin-accommodation holes 9 formed therein. The guide plate 8 has no meshing teeth adapted for meshing with a sprocket and does not take part in meshing with the sprocket. The pin-accommodation holes 9 of the guide plate 8 are press-fit with the connecting pins 7. In each link plate row, the flat back faces 10 of the guide plates 8 and the flat back faces 4 of the outer link plates 6 lie substantially flush with each other.

As shown in FIG. 1, the chain 1 is composed of rows of articulate link plates K and rows of guide link plates G alternately arranged in the longitudinal direction of the chain 1. The link plates K in each articulate link plate row are composed of the inner link plates 5 and the outer link plates 6 disposed in the width direction of the chain. The link plates G in each guide link plate row are composed of the inner link plates 5, the outer link plates 6 and the guide plates 8. The inner and outer link plates 5, 6 in the articulate link plate rows K are pivotally movable relative to the connecting pins 7.

In the case where the chain 1 is wound around a driving sprocket 2 mounted to an engine crankshaft (not shown) and driven sprockets mounted to two spaced camshafts, the meshing teeth 2 (of the inner link plates 5) projecting from the inner peripheral side of the chain 1 mesh with teeth of these sprockets. In addition, when a sprocket of an auxiliary device is disposed outside the chain 1, the meshing teeth 2 (of the outer link plates 6) projecting from the outer peripheral side of the chain 1 mesh with teeth of the sprocket of the auxiliary device.

Figure 17:
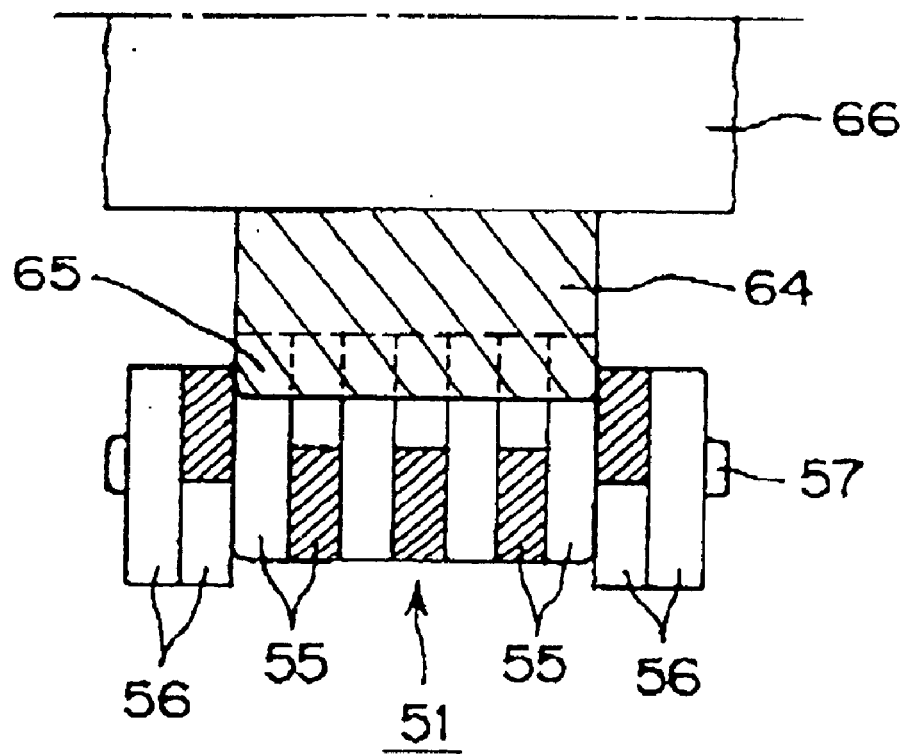
FIG. 17 is a cross-sectional view corresponding to FIG. 15, showing the manner in which the silent chain portion is in mesh with a sprocket disposed on an inner peripheral side of the silent chain.
Figure 18:
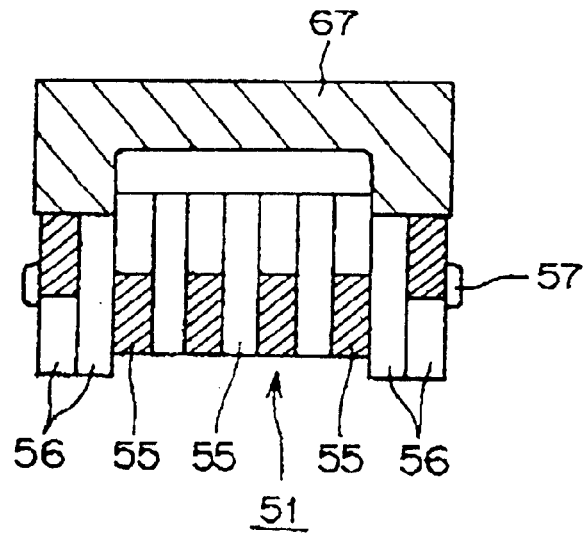
FIG. 18 is a cross-sectional view corresponding to FIG. 15, showing the manner in which the silent chain portion is in mesh with a shoe disposed on an inner peripheral side of the silent chain.
Figure 19:
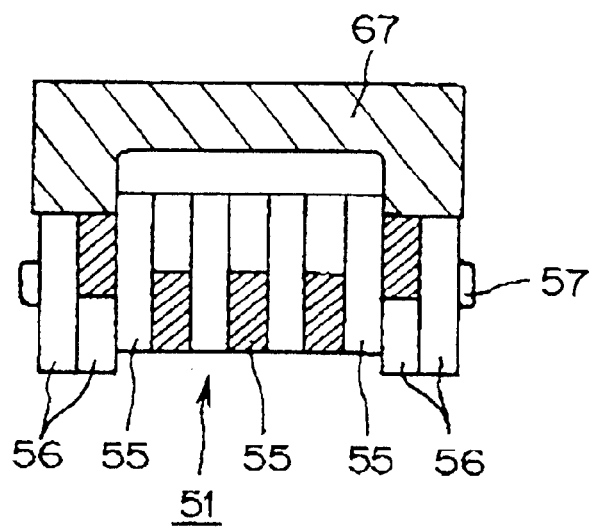
FIG. 19 is a cross-sectional view corresponding to FIG. 16, but showing the manner in which the silent chain portion is in mesh with the shoe disposed on the inner peripheral side of the silent chain.

The sprockets used for mesh with the meshing teeth 2 of the inner link plates 5 projecting from the inner peripheral side of the chain 1 at the widthwise central portion of the chain 1 are composed of a standard sprocket designed for mesh with a single-sided meshing type silent chain. Meshing between the standard sprocket and the inner link plates 5 occurs in the same manner as the conventional meshing shown in FIG. 17.

Figure 11:
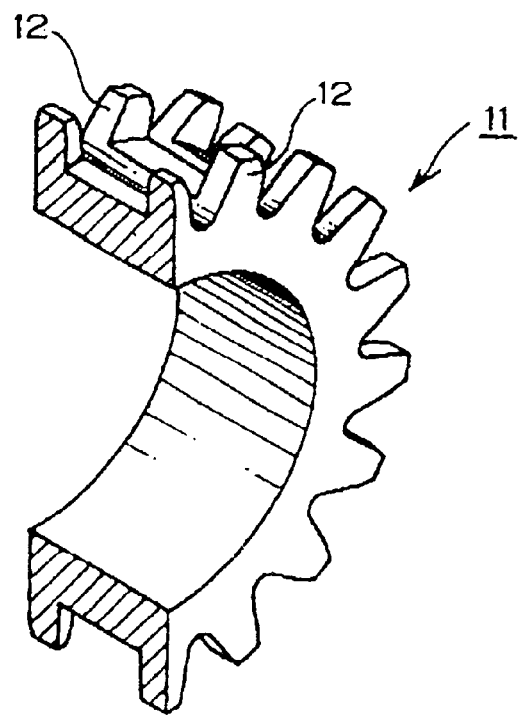
FIG. 11 is a fragmentary perspective view of a sprocket used for meshing with a double-sided meshing type silent chain of the present invention on an outer peripheral side of of the silent chain.

The sprocket used for mesh with the meshing teeth 2 of the outer link plates 6 projecting from the outer peripheral side of the chain 1 comprises a sprocket 11 which, as shown in FIG. 11, has a pair of rows of meshing teeth 12 formed on an outer circumferential surface thereof along opposite edges for meshing with the meshing teeth 2 of the outer link plates 6 projecting from the outer peripheral side of the chain 1.

Figure 3:
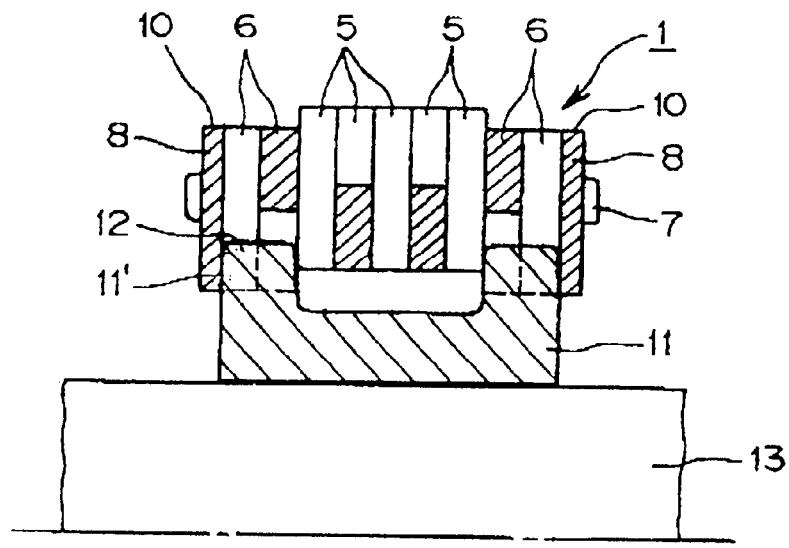
FIG. 3 is a cross-sectional view taken along line A—A of FIG. 2, showing the manner in which a portion of the silent chain is in mesh with a sprocket disposed on an outer peripheral side of the silent chain.

FIG. 3 shows in cross section the manner in which the meshing teeth 2 of the outer link plates 6 engage the teeth 12 of the sprocket 11 when a chain portion located in the vicinity of a line A—A shown in FIG. 2 is in mesh with the sprocket 11 on the outer peripheral side of the chain. Similarly, FIG. 4 illustrates the manner in which the meshing teeth 2 of the outer link plates 6 engage the teeth 12 of the sprocket 11 when a chain portion located in the vicinity of a line B—B shown in FIG. 2 is in mesh with the sprocket 11 on the outer peripheral side of the chain.

When the meshing teeth 2 of outer link plates 6 projecting from the outer peripheral side of the chain 1 mesh with the teeth 12 of the sprocket 11 at the chain portion located in the vicinity of the line A—A of FIG. 2, the inner link plates 5 laterally adjacent to the outer link plates 6 are out of sliding contact with the sprocket 11, whereas the guide plates 8 are in slide contact with opposite end faces 11' of the sprocket 11 (i.e, outer end faces of the sprocket teeth 12), as shown in FIG. 3. Thus, the chain 1 is stably guided against lateral movement or oscillation. Similarly, at the chain portion located in the vicinity of the line B—B of FIG. 2, as shown in FIG. 4, the inner link plates 5 located adjacent to the outer link plates 6 are in slide contact with two opposed inside surfaces 11" of the sprocket 11 (i.e., inner end faces of the sprocket teeth 12) to thereby guide the travel of the chain 1. Thus, the chain can travel stably without causing lateral oscillation.

Figure 4:
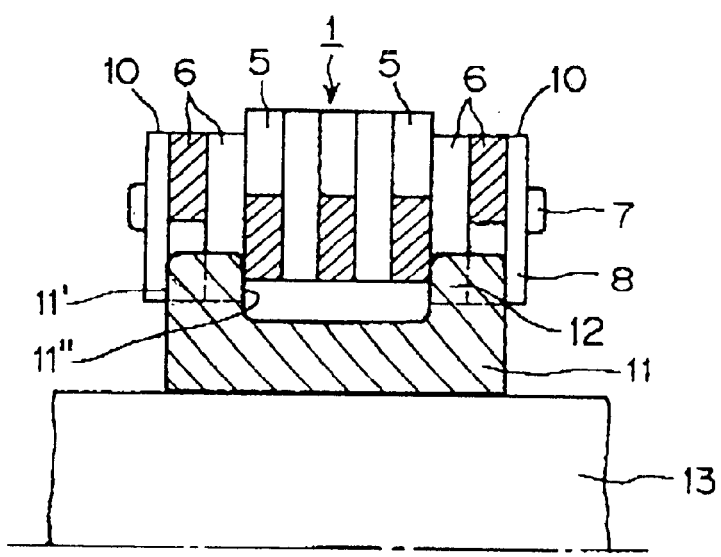
FIG. 4 is a cross-sectional view taken along line B—B of FIG. 2, showing the manner in which a portion of the silent chain is in mesh with the sprocket disposed on the outer peripheral side of the silent chain.
Figure 5:
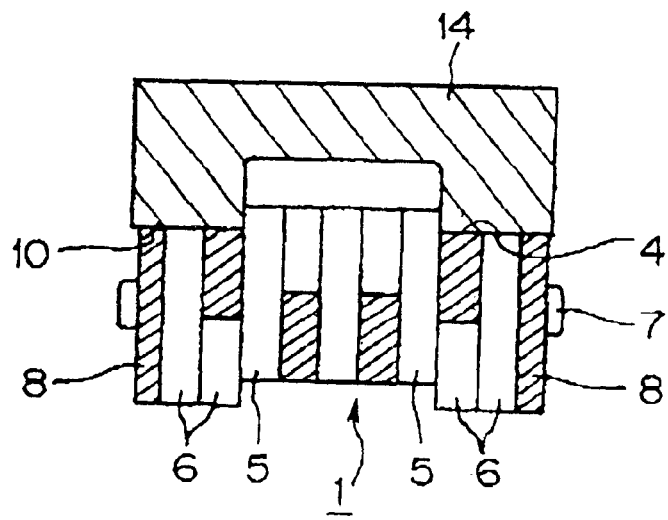
FIG. 5 is a cross-sectional view taken along line A—A of FIG. 2, showing the manner in which a portion of the silent chain is in mesh with a shoe disposed on an inner peripheral side of the silent chain.
Figure 6:
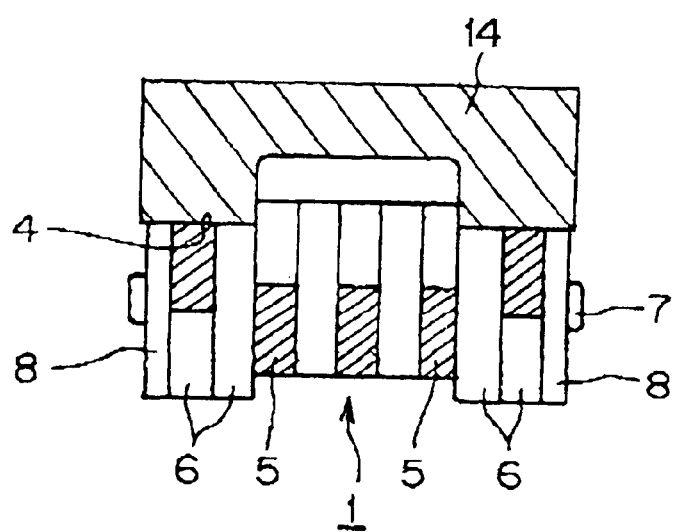
FIG. 6 is a cross-sectional view taken along line B—B of FIG. 2, showing the manner in which a portion of the silent chain is in mesh with the shoe disposed on the inner peripheral side of the silent chain.

FIGS. 5 and 6 are cross-sectional views similar to FIGS. 3 and 4, respectively, but showing the manner in which the flat back faces 4 of the outer link plates 6 engage a shoe 14 of a guide member when the chain portions respectively located in the vicinity of the lines A—A and B—B of FIG. 2 are in slide contact with the shoe 14 disposed on the inner peripheral side of the chain 1.

When the shoe 14 of the guide member (such as a chain tensioner or a guide member) disposed on the inner peripheral side of the chain 1 guides the chain 1, the flat back faces 4 of the outer link plates 6 and the flat back faces 10 of the guide plates 8 located in the vicinity of the line A—A of FIG. 2 are in slide contact with the shoe 14, as shown in FIG. 5. Similarly, at the chain portion located in the vicinity of the line B—B of FIG. 2, the flat back faces 4 of the outer link plates 6 are in slide contact with the shoe 14. Thus, the chain 1 can be stably guided in a direction perpendicular to the width direction thereof. Especially because at the chain portion located in the vicinity of the line A—A of FG. 2, both the flat back faces 4 of the outer link plates 6 and the flat back faces 10 of the guide plates 8 concurrently engage the shoe 14, a surface pressure applied to the shoe 14 is considerably low and wear on the shoe 14 can, therefore, be reduced.

A second embodiment of the present invention will be described with reference to FIGS. 7 through 10. A double-sided meshing type silent chain 1' in this embodiment differs from the chain 1 in the foregoing embodiment only in that the number of the inner link plates 5 is seven. Other structural details of the chain 1' are identical to those of the chain 1 and a further description thereof can be omitted. The number of the inner link plates 5 should be no means be limited to five or seven as in the illustrated embodiment but can be selected at option.

Figure 7:
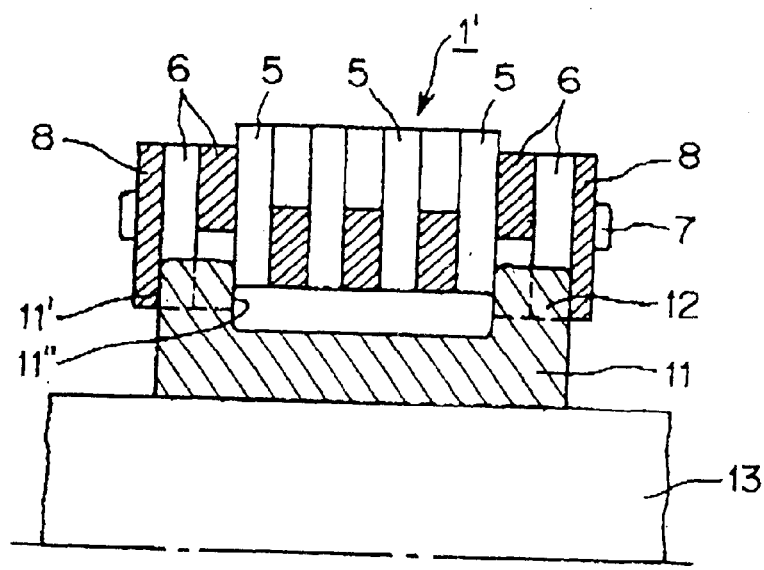
FIG. 7 is a cross-sectional view corresponding to FIG. 3, but showing the manner in which a portion of a double-sided meshing type silent chain according to a second embodiment of the present invention is in mesh with a sprocket disposed on an outer peripheral side of the silent chain.
Figure 8:
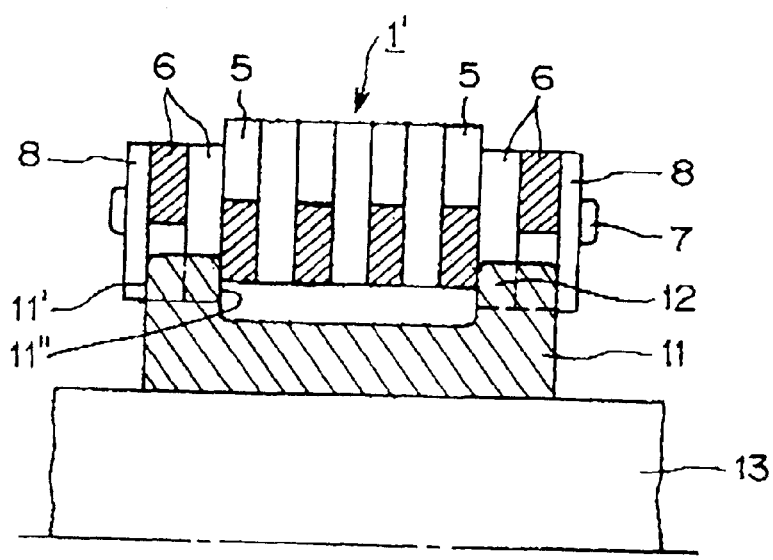
FIG. 8 is a cross-sectional view corresponding to FIG. 4, but showing the manner in which a portion of the silent chain of the second embodiment is in mesh with the sprocket disposed on the outer peripheral side of the silent chain.

FIGS. 7 and 8 show the manner in which the meshing teeth 2 of the outer link plates 6 and the teeth 12 of the sprocket 11 mesh with each other when an outer peripheral side of the chain 1" engages the sprocket 11 at two different portions corresponding in position to the portions of chain 1 located in the vicinity of the lines A—A and B—B of FIG. 2.

As in the same manner as the chain 1 of the first embodiment, the guide plates 8 of the chain 1" are in slide contact with opposite end faces 11" of the sprocket 11 (i.e., outer end faces of the sprocket teeth 12) to thereby guide the travel of the chain 1", as shown in FIG. 7. Similarly, the inner link plates 5 located adjacent to the outer link plates 5 are in slide contact with opposed inside surfaces 11" of the sprockets 11 (i.e., inner end faces of the sprocket teeth 12) to thereby guide the travel of the chain 1". The chain 1" thus guided can travel stably without causing lateral oscillation.

FIGS. 9 and 10 are cross-sectional views corresponding to FIGS. 7 and 8, respectively, but showing the manner in which the flat back faces 4 of the outer link plates 6 and the flat back faces 10 of the guide plates 8 engage a shoe 14 when the chain 1" is in slide contact with the shoe 14 disposed in on the inner peripheral side of the chain 1".

When the shoe 14 of a chain tensioner or of a guide member disposed on the inner peripheral side of the chain 1" guides the chain 1", the flat back faces 4 of the outer link plates 6 and the flat back faces 10 of the guide plates 8 located in the vicinity of the line A—A of FIG. 2 are in slide contact with the shoe 14, as shown in FIG. 9. Similarly, at the portion of chain 1" located in the vicinity of the line B—B of FIG. 2, the flat back faces 4 of the outer link plates 6 are in slide contact with the shoe 14. Thus, the chain 1" can be stably guided in a direction perpendiculars to the width direction thereof. Especially because at the chain portion located in the vicinity of the line A—A of FG. 2, both the flat back faces 4 of the outer link plates 6 and the flat back faces 10 of the guide plates 8 concurrently engage the shoe 14, a surface pressure applied to the shoe 14 is considerably low and wear on the shoe 14 can, therefore, be reduced.

Figure 12A:
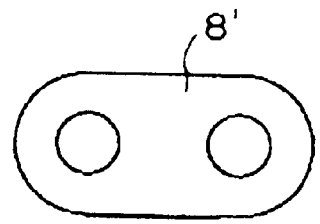
FIGS. 12A and 12B are plan views showing modified forms of the guide plate of the double-sided meshing type silent chain.
Figure 12B:
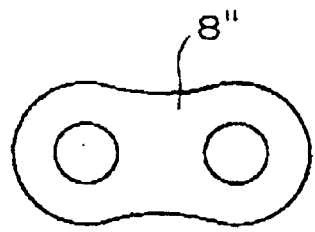
Figure 13:
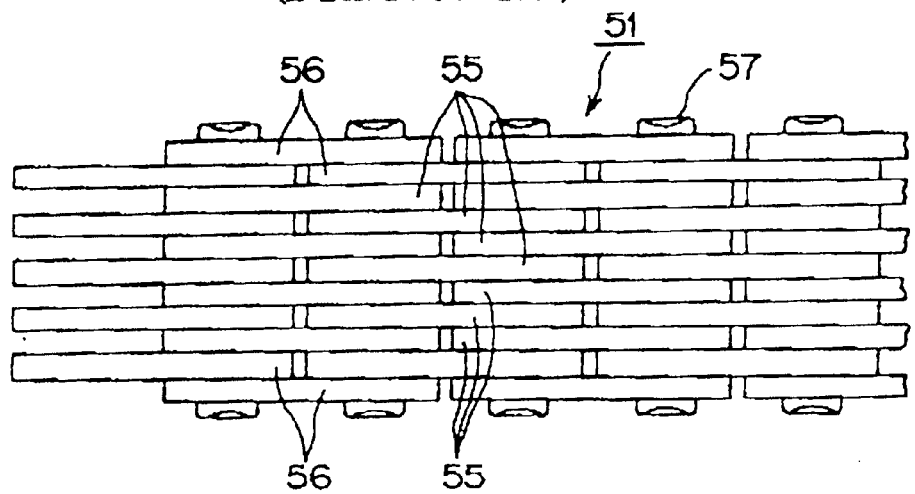
FIG. 13 is a fragmentary plan view showing a conventional double-sided meshing type silent chain.
Figure 14:
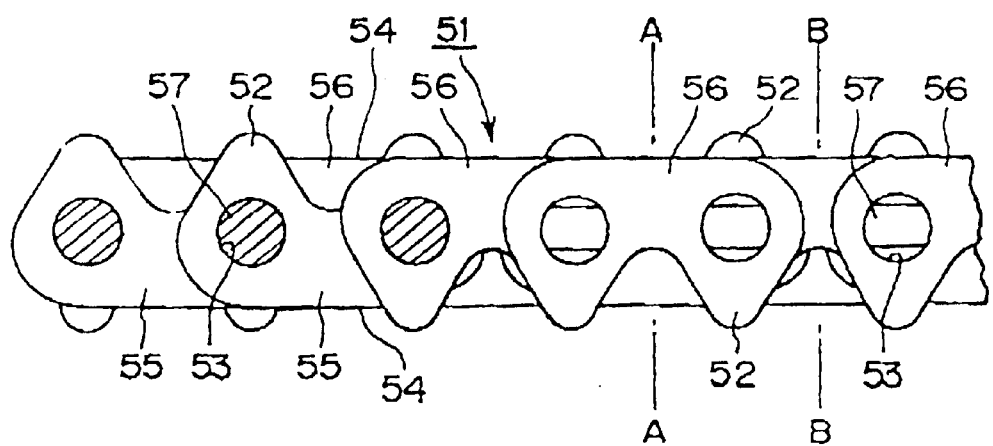
FIG. 14 is a side view of FIG. 13.
Figure 15:
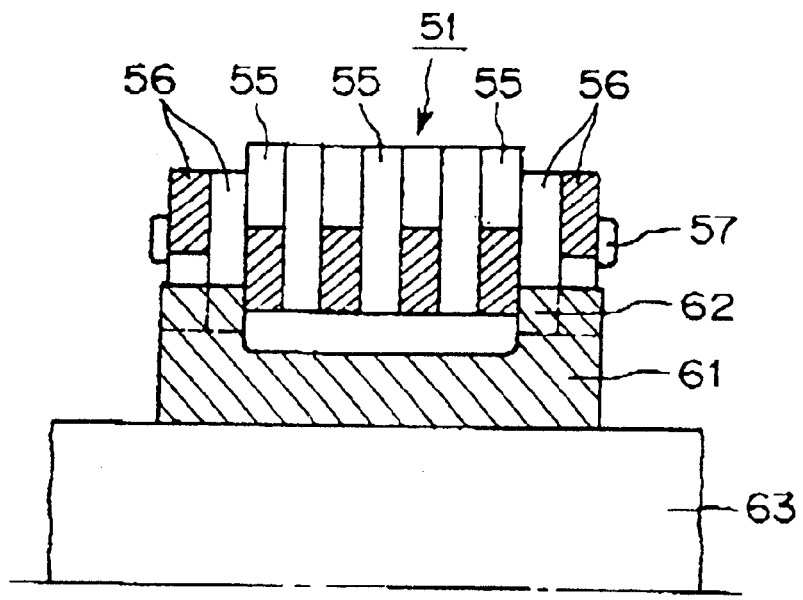
FIG. 15 is a cross-sectional view taken along line A—A of FIG. 14, showing the manner in which a portion of the conventional silent chain is in mesh with a sprocket disposed on an outer peripheral side of the silent chain.
Figure 16:
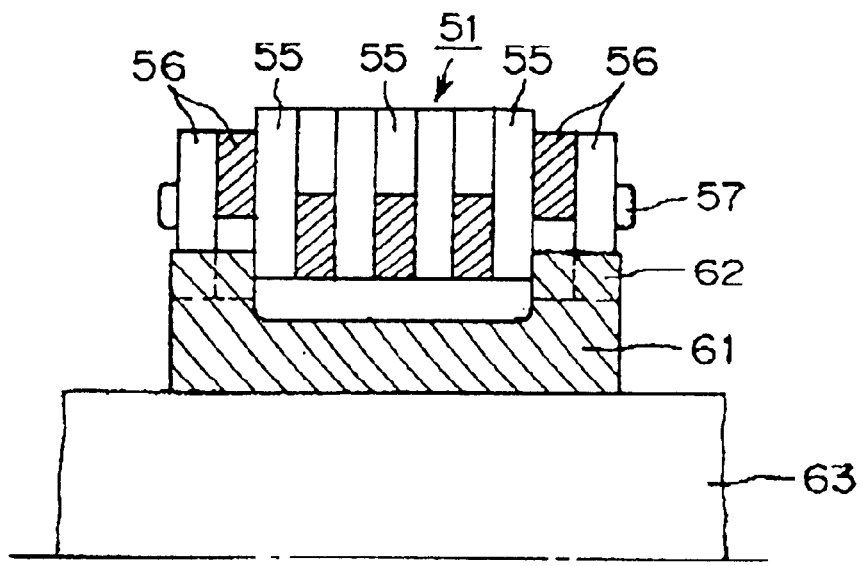
FIG. 16 is a cross-sectional view taken along line B—B of FIG. 14, showing the manner in which a portion of the conventional silent chain is in mesh with the sprocket disposed on the outer peripheral side of the silent chain.

In the embodiments described above, the connector pins 7 are preferably coated with a rigid oxide film of chromium (Cr), vanadium (V), niobium (Nb) or tungsten (W) applied by a special surface treatment process to improve the wear resistance of the connecting pins 7. Inside flanks or outside flanks of each meshing teeth 2 of the inner and outer link plates 5, 6 preferably have a flat surface for the purpose of reducing abrasive wear of the sprocket teeth 12. A combined thickness of the inner link plates 5 may be made equal to a combined thickness of the outer link plates 6. Additionally, a combined thickness of the link plates K in each articulate link plate row may be made equal to a combined thickness of the link plates G in each guide link plate row. By thus equalizing the link plate thicknesses, the strength balance of the chain 1, 1" can be improved. The guide plates 8 may be replaced with first and second modified guide plates 8' and 8" shown in FIGS. 12A and 12B, respectively. In the illustrated embodiments previously described, the link plates 5, 6 of the chain 1, 1" are oriented such that the meshing teeth 2 of link plates 5 located in the widthwise central portion of the chain project from the inner peripheral side of the chain, and the meshing teeth 2 of lini plates 6 located in the opposite widthwise end portions of the chain project from the outer peripheral side of the chain. This orientation may be changed depending on the way of use of the chain such that the inner peripheral side of the chain forms an outer peripheral side of the chain, and the outer peripheral side of the chain forms an inner peripheral side of the chain. In the latter case, the link plates are oriented such that the meshing teeth of link plates located in the widthwise central portion of the chain project from the outer peripheral side of the chain, and the meshing teeth of link plates located in the opposite widthwise end portions of the chain project from the inner peripheral side of the chain.

According to the double-sided meshing type silent chain 1, 1" of the present invention, as set forth above, guide plates 8 each having a flat back face 10 formed on one side thereof and a pair of pin-accommodation holes 9 formed therein are disposed at opposite widthwise ends of the chain with the pin-accommodation holes 9 press-fit with connecting pins 7 which are each adapted to articulately connect two adjacent rows of link plates 5, 6 (k, G) with each other in an interleaved fashion. The guide plates 8 do not take part in meshing engagement with the sprocket 11 but serves in double as a retainer of the connecting pins 7 and a strengthening member of the chain. By thus providing the guide plates 8, it is possible to increase the strength of the chain. Since the inner and outer link plates 5 and 6 adapted for meshing with the sprocket are not press-fit with the connecting pins 7 but pivotally movable relative to the connecting pins 7, an impact sound generated periodically at meshing between the link plates and sprocket can be suppressed by an damping effect attained by air or oil trapped in a clearance between an inner circumferential surface of each pin-accommodation hole 3 and an outer circumferential surface of the mating connecting pin 7. The overall noise level of the chain can, therefore, be reduced.

Since the inner and outer link plates 5 and 6 are not secured by press-fitting to the connecting pins 7, it is possible to reduce an impact force or shock exerted on the connecting pins 7 when engagement occurs between the link plates 5, 6 and the sprocket. As a result, contact pressure between the inner circumferential holes 3 of the respective link plates 5, 6 and the outer circumferential surfaces of the respective connecting pins 7 is considerably reduced, thereby protecting the connecting pins 7 and pin-accommodation holes 3 against wear. This may result in a considerably reduced wear elongation of the chain. In addition, since an impact force or shock exerted on the sprocket teeth can be also reduced, wear of the sprocket teeth is considerably low.

Figure 20:
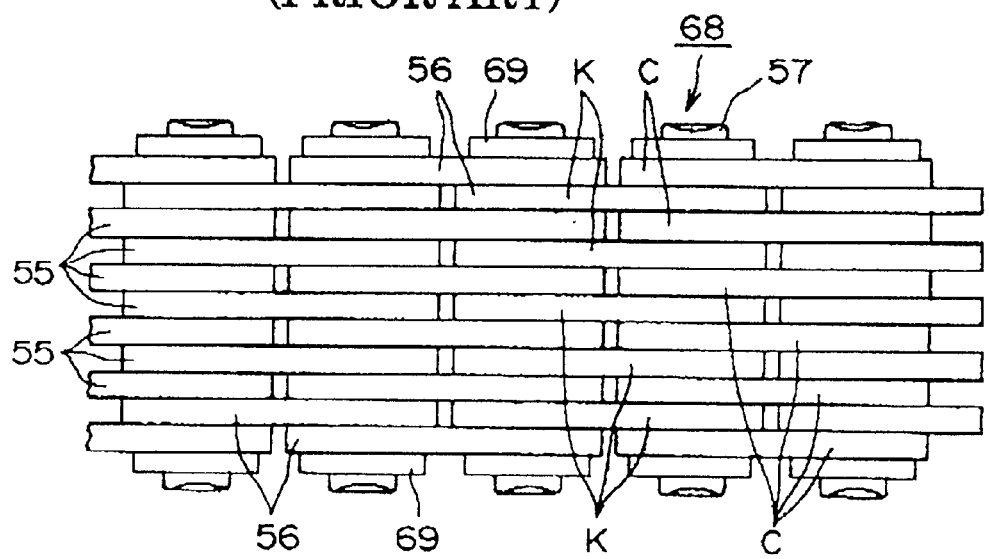
FIG. 20 is a fragmentary plan view showing another conventional double-sided meshing type silent chain.
Figure 21:
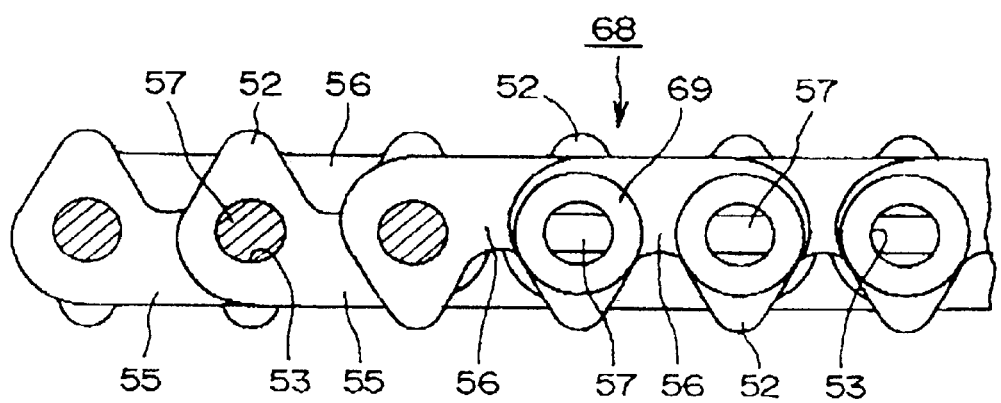
FIG. 21 is a side view of FIG. 20.

By virtue of the press-fit connection between the guide plates 8 and the connecting pins 7, friction engagement occurs only between the link plates K in the articulate link rows and the connecting pins 7. This arrangement is able to reduce the total amount of abrasive wear and the resulted wear elongation of the chain, as compared to the convention arrangement shown in FIGS. 20 and 21, in which all of the link plates 55,56 (K, C) are permitted to pivot relative to the connecting pins 57. Additionally, since the guide plates 8 are in guided contact with the sprocket 11, the sprocket 11 while being driven by the outer link plates 6 on the outer peripheral side of the chain is provided with one pair of guides (guide plates) at each sprocket tooth pitch. With this guided arrangement, the chain can travel with improved stability. As a result, it is possible to preclude reduction of strength, accelerated wear elongation of the chain, accelerated wear of the shoe and increased noise level, which may occur due to twisting of the chain during travel.

Furthermore, since the guide plates 8 have a flat back face 10 adapted for sliding contact with the shoe 14, the total number of plates engaged in sliding contact with the shoe 14 increases with the result that the surface pressure acting on the shoe is reduced to thereby suppress wear of the shoe 14. Additionally, the guide plates 8 do not take part in meshing engagement with the sprocket, it is possible to change the thickness of the guide plates 8 so as to balance the strength between the adjacent chain pitches. Apart from the thickness change, the shape of the guide plates 8 can be changed to achieve balancing of the chain pitch. Thus, the guide plates 8 have a higher degree of design freedom and can increase the strength of the chain.

Since the inner and outer link plates 5 and 6 adapted for meshing engagement with sprockets are not secured by press-fitting connection to the connecting pins 7, inside and outside flanks (serving as engagement surfaces) of the teeth of these plates 5, 6 are free from swelling or deformation which may occur when the link plates 5, 6 are press-fit with the connecting pins 7. Thus, the accuracy of the flanks can be maintained.

As described above, the guide plates 8, which do not take part in meshing engagement with the sprocket, have a higher degree of design freedom. Accordingly, by employing a configuration of higher strength, it is possible to reduce the thickness of the guide plates 8, thereby reducing the chain without lowering the strength of the chain. Furthermore, the guide plates 8 may be formed into a configuration which is able to limit or minimize the amount of oil leaking out in the lateral outward direction from engagement portions between the link plate meshing teeth and the sprocket teeth. Owing to its higher degree of design freedom, the guide plates 8 can take any specific form which is readily distinguishable from the shape of the link plates 5, 6 to thereby eliminate improper assembling caused due confusion between the link plates 5, 6 and the guide plates 8.

Since the guide plates 8 are not used for meshing engagement with the sprocket, the chain of the present invention can find a necessary space for marking in an easier manner than the conventional chain having toothed link plates at opposite widthwise ends thereof.

Unlike the conventional double-sided meshing type silent chain, the outer link plates 6 located adjacent to the opposite widthwise ends of the chain are not secured by press-fitting to the connecting pins 7. This arrangement enables to eliminates a problem which may occur as in the case of the conventional press-fit connection such that due to the combined effect of a stress exerted to the peripheral portions of the respective pin-accommodation holes of the outer link plates when the meshing teeth of the outermost link plates collide with the teeth of the sprocket at the onset of meshing engagement, and a tensile stress which has been created in the peripheral portions of the pin-accommodation holes of the outermost link plates due to press-fit connection with the connecting pins, the mechanical strength of the chain is considerably reduced.

In the double-sided meshing type silent chain 1, 1" of the present invention, the flat back sides 4 of the outer link plates 6 and the flat back sides 10 of the guide plates 8 lie substantially flush with each other. In an application in which the chain is guided by a guide member disposed on an inner peripheral side of the chain, both the flat back faces 4 of outer link plates 6 and the flat back faces 10 of guide plates 8 are concurrently brought into sliding contact with a shoe 14 of the guide member. This arrangement lowers surface pressure acting on the shoe and prolongs service life of the shoe.

Obviously, numerous modifications and variations of the present invention are possible in light of the above teachings. It is therefore to be understood that within the scope of the appended claims, the present invention may be practiced otherwise than as specifically described herein.

What is claimed is:

1. A double-sided meshing type silent chain comprising:
    a plurality of interleaved rows of link plates articulately connected with one another by connecting pins, each of the link plates having a pair of meshing teeth formed on one side thereof, a flat back face formed on the opposite side thereof, and a pair of pin-accommodation holes for receiving therein a pair of connecting pins, respectively, of the connecting pins;
    the link plates in each link plate row being composed of at least one pair of outer link plates disposed in opposite end portions, respectively, in the width direction of the chain, and a plurality of inner link plate disposed in a central portion in the width direction of the chain and disposed between the end portions, the inner and outer link plates being oriented such that the meshing teeth of the inner link plates project from one peripheral side of the chain and the meshing teeth of the outer link plates project from the opposite peripheral side of the chain; and guide plates located outside the row of link plates in the width direction of the chain, each of the guide plates having a flat back face formed on one side thereof and a pair of pin-accommodation holes formed therein, each of the pin-accommodation holes of each of the guide plates and each of the pin-accommodation holes of each of the link plates receiving one of the connecting pins, said connecting pins extending through holes in the link plates, and being press-fit only in said pin-accommodation holes of the guide plates.

2. A double-sided meshing type silent chain according to claim 1, wherein the flat back faces of the outer link plates and the flat back faces of the guide plates lie flush with each other.

* * * * *